United States Patent [19]

Jeppsson

[11] 4,230,923

[45] Oct. 28, 1980

[54] DEVICE FOR INDUCTION WELDING

[75] Inventor: Jan-Bertil Jeppsson, Lomma, Sweden

[73] Assignee: AB Akerlund & Rausing, Sweden

[21] Appl. No.: 912,084

[22] Filed: Jun. 2, 1978

[30] Foreign Application Priority Data

Jun. 20, 1977 [SE] Sweden .............................. 7707091

[51] Int. Cl.³ .................... B23K 13/02; H05B 6/42
[52] U.S. Cl. ..................... 219/10.53; 219/10.49 R; 219/10.79; 156/380
[58] Field of Search ............ 219/10.53, 10.49, 10.79, 219/9.5, 7.5, 10.75; 165/171, 168; 156/272, 380

[56] References Cited

U.S. PATENT DOCUMENTS

| 2,402,508 | 6/1946 | Strickland, Jr. | 219/10.79 |
|---|---|---|---|
| 2,439,517 | 4/1948 | Johnson | 219/10.53 |
| 2,471,471 | 5/1949 | Wood | 219/10.79 |
| 2,572,646 | 10/1951 | Menzel et al. | 219/10.53 |
| 3,387,653 | 6/1968 | Coe | 165/171 |
| 3,428,771 | 2/1969 | Cleaver | 219/10.49 |
| 3,497,657 | 2/1970 | Lavins | 219/10.49 |
| 3,536,568 | 10/1970 | Rothstein | 219/10.53 |
| 3,548,140 | 12/1970 | O'Neill | 219/10.53 |
| 4,089,324 | 5/1978 | Tjaden | 165/171 X |

Primary Examiner—B. A. Reynolds
Assistant Examiner—Philip H. Leung
Attorney, Agent, or Firm—Lerner, David, Littenberg & Samuel

[57] ABSTRACT

A device for induction welding apparatus fashioned partly from a metal plate is disclosed. The metal plate is constructed so as to form an inductive loop for generating eddy currents in electrically conductive material placed adjacent thereto. The metal plate contains a groove for carrying a cooling medium; a second, similarly configured non-conductive plate is attached to the metal plate over said groove to allow passage of said cooling medium in said groove.

10 Claims, 4 Drawing Figures

U.S. Patent  Oct. 28, 1980  4,230,923
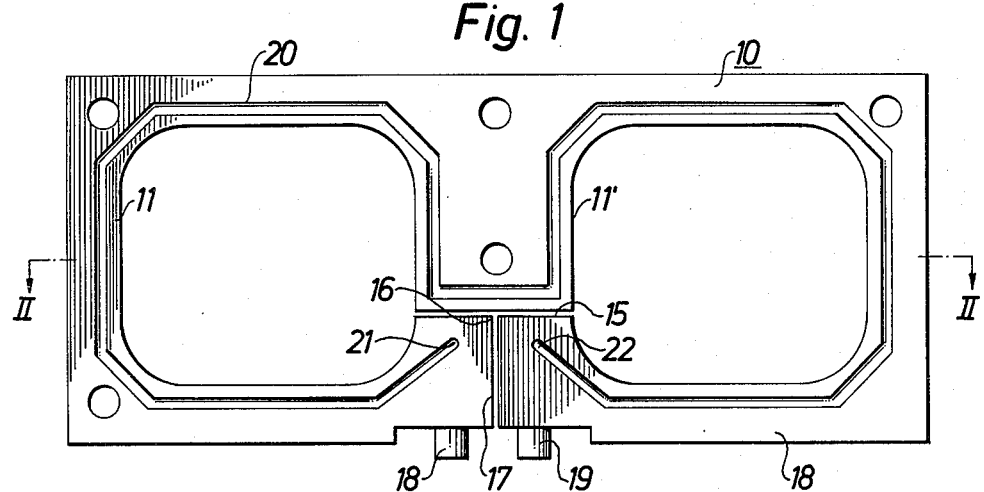
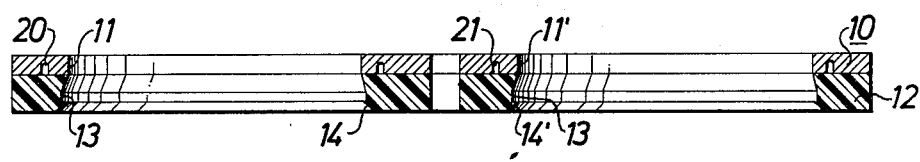
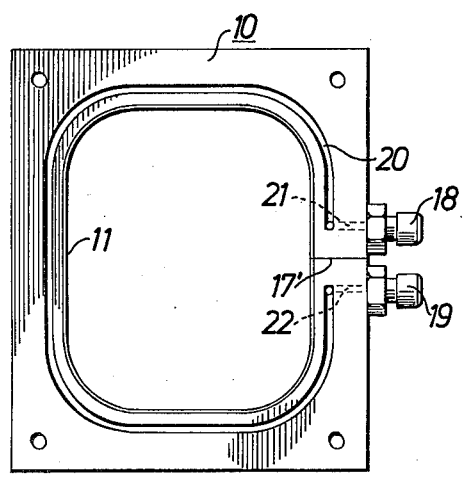
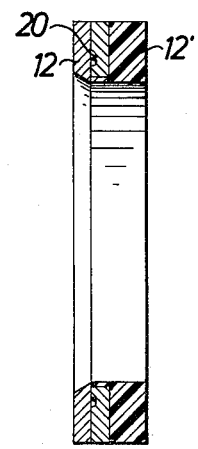

DEVICE FOR INDUCTION WELDING

BACKGROUND OF THE INVENTION

This invention relates to devices for high frequency induction welding, and in particular to apparatus of this kind which is fluid cooled.

It is well-known to weld together plastic laminates with aluminium foil attached thereto by means of inducing a high frequency current in the foil. This technique has been developed considerably during recent years, and it is now possible to weld together most types of thermoplastic products provided that the detailed outlines which are to be welded together include some kind of eddy current creating material. This may be aluminium foil, iron oxide powder, or other similar electrically conductive material applied in the region of the intended welding area. In certain cases, the plastic material itself contains a sufficient amount of conducting pollutants for directly allowing welding together by induction welding. The operating frequencies used normally fall within the one to five MHz region. In this frequency region the resistive power loss in the welding tool (i.e. the inductive loop) is not great. This due to the high inductive reactance of the loop at said frequencies and the so-called skin effect.

Nevertheless, during the operation of the welding tool, considerable heating of the tool occurs. In order to obtain an undisturbed operation during constant use, the built up heat must be conducted away. In prior art apparatus this heat removal was accomplished by circulating a cooling medium through an induction loop comprising an electrically conducting pipe having a fluid inlet and outlet for transmission of the cooling medium. Reasons for using pipes for prior art induction coils include the simple and efficient cooling characteristics thereof, and the relatively large outside surface area thereof, resulting in lowered electrical resistance to skin effect currents.

The prior art inductive welding tools based on the known technique, require a precise working operation to bend the pipe to a loop having the required well-defined inner and outer contours. Thereafter the loop is placed in an isolating support having the corresponding, well-defined inner contour. This is a very expensive process. In spite of careful bending of the pipe, there arise restrictions at the regions of the bends of the pipe. These restrictions decrease the available cross-section for the circulation of the cooling fluid which may result in undesired effects when welding. Also, the cooling channels of the pipes are relatively inaccessable. Thus there is no simple method for cleaning the channels.

SUMMARY OF THE INVENTION

The apparatus of the instant invention produces as good welding results as the prior art devices, but employs a considerably simpler inductive loop design. The invention has an inductive loop formed in the shape of a conducting plate provided with a large hole, said plate having an arbitrarily shaped outer contour. The instant arrangement includes several advantages over the prior art pipe loops.

The main objects of the instant invention include the elimination of the above-mentioned drawbacks of the known induction welding devices. The device according to the invention basically comprises a device for induction welding, including a closed, electrically conducting path and a cooling fluid passage provided therein. A main characterizing feature of the invention is that the electrically conducting path is formed by a metal plate having a large aperture provided therein around the welding area and having an electrically isolating slot between the aperture and the outmost edge of the plate, said plate having a cooling fluid passage comprising a groove provided in the surface of the plate and extending completely or partly around said large aperture. A second, non-conducting plate of similar shape is attached over the conducting plate to contain the cooling fluid in the groove. Further characterizing features of the invention will become apparent to the reader from the following detailed description of a pair of preferred embodiments with reference to the accompanying drawing.

BRIEF DESCRIPTION OF THE DRAWING

FIG. 1 shows an embodiment of an induction welding plate according to the invention seen from below and with the second non-conducting plate normally attached thereto removed.

FIG. 2 is a cross-sectional view of the plate of FIG. 1.

FIG. 3 discloses another embodiment of an induction welding plate according to the invention.

FIG. 4 is a cross-sectional view of the plate in FIG. 3.

DETAILED DESCRIPTION OF THE PREFERRED EMBODIMENTS

Referring now to FIG. 1, plate 10 is made of copper, brass or other similar electrically highly conductive material. There are two apertures 11, 11' provided in the plate. The outermost edges of said apertures correspond to the outer contour of a cover (not shown) which is to be sealed by induction welding against a container casing. The tool according to FIG. 1 is intended to simultaneously seal two covers to two casings belonging thereto.

To the underside of plate 10 is attached a plate 12 of electrically insulating material such as bakelite. The plate 12 may be glued, bolted or otherwise attached to the plate 10. Aligned and congruent with the apertures 11, 11' in the plate 10, are apertures 13, 13' in the plate 12. Said apertures have a contour corresponding to the outermost contour of the flanges of the covers which are to be sealed. As shown in FIG. 2, there are shoulders 14, 14' at the lower regions thereof, said shoulders being formed by an upwardly conical portion of the aperture proper. Said shoulders 14, 14' are intended to support a cover in the proper apertures 11, 13 and 11', 13'.

The apertures 11, 11' are interconnected by a narrow slot 15. Preferably, said slot has a width of approximately 0.3 millimeters. At the center point 16 of the slot 15 there interconnects a further slot 17 which extends to the outermost edge of plate 10. Thus, together the slots 15, 17 form a T-shaped slot. The slots 15, 17 divide the plate 10 into portions isolated from each other in the region between the apertures. On one side of said slotted plate, there is attached a first electrical connecter 18, and on the other side there is a corresponding second electrical connecter 19.

When a high frequency voltage source (not shown) is applied to the connecters 18 and 19, there results a closed current path in the plate 10. Due to the electrical skin effect, this current path primarily extends along either side of the slot 17, and slot 15 to either of the aperture outer edges 11, 11'. The skin effect results in a current flow also at the rest of the outermost surfaces of the plate 10. The magnetic field obtained will be concentrated in the region of the outermost edges 11, 11' due to the inductive coupling of the conducting material attached to the cover being sealed.

As mentioned above, during constant use there will be some heat conduction to the plate 10. To arrange for heat removal there is arranged a groove 20 in the plate, and said groove substantially encompasses the entire circumference of the aperture 11, 11'. Ends 21 and 22 of the groove 20 are connected to an inlet and outlet, respectively, (not shown) for transmittal of a cooling fluid, for instance water. As shown in FIGS. 2 and 4, the combination of plate 12 and groove 20 gives a closed passage for transmittal of the cooling fluid under pressure. Since the extension of the cooling fluid groove 20 is entirely independent of the contour of the apertures 11 and 11', the cooling fluid groove may be so configured so that it compensates for possible discontinuities in the magnetic field and resulting hot spots that might arise along the aperture contours. Thus, the design of the groove 20 is selected with this in mind. The above description also applies to the embodiment of FIGS. 3 and 4 which have the same reference numerals as in FIGS. 1 and 2. Prime signs have however been added to the reference numerals for the slot 17' and the numeral for the plate 12'. It should be noted that the conducting plate and the non-conducting plate can be formed into an integral unit. For instance, it is possible to use a non-conducting housing of solid polyurethanes. The groove 20 may also be completely or partly provided in the conducting plate or the non-conducting plate. Although a pair of specific embodiments of the invention have been described, it is to be realized that many variations and modifications thereof will be apparent to those skilled in the art, and hence, the scope of the invention is defined by the following claims.

What is claimed is:

1. A device for inductive welding comprising:
   metallic plate means having an arbitrary contour formed of highly conductive material, said metallic plate means having at least one aperture therein configured to admit materials to be welded, and said metallic plate means having a slot therein defining a high frequency current path within said metallic plate means about said aperture;
   cover plate means configured to cover at least a portion of said metallic plate means about said at least one aperture, said cover plate means being made of nonconductive material and having therein at least one aperture corresponding generally in configuration to said at least one aperture within said metallic plate means when said cover plate means is in a covering relationship therewith, said metallic plate means and said cover plate means defining a cooling fluid groove therebetween in the form of a closed passage disposed substantially about said at least one aperture for conveying cooling fluid thereabout, said cooling fluid groove defined being configured to cool said metallic plate means in response to inductive heating; and
   means for applying high frequency voltage to said high frequency current path within said metallic plate means.

2. The device according to claim 1 wherein said cover plate means completely covers said metal plate means and exhibits a contour coterminous therewith.

3. The device according to claim 1 wherein said metal plate means and said cover plate means each have a plurality of apertures therein and said cooling fluid groove defined is disposed substantially about each of said plurality of apertures in said metal plate means.

4. The device according to claim 3 wherein each of said metal plate means and said cover plate means have two apertures therein and said slot in said metal plate means takes the form of a tee shaped slot having a vertical portion disposed between the periphery of said metal plate means and a portion thereof intermediate said apertures and horizontal arm portions extending between said vertical portion and said apertures.

5. A device according to claim 1 wherein the width of said slot is less than one millimeter.

6. A metallic device according to claim 1, or 2, or 3 wherein said metallic plate means is arranged for induction welding covers to container cases, by including two adjacent apertures formed in said conducting plate, each aperture having a contour corresponding to the external contours of said covers.

7. A device according to claim 6 wherein the cross section of said apertures is substantially rectangular with rounded corners, said apertures being oriented short-side against short-side, and said slot is tee shaped and connects each of said apertures and an outermost edge of said metallic plate means.

8. A device according to claim 1, or 2, or 3, or 4 wherein said induction welding is carried out at a frequency in the range of 1 to 5 megahertz.

9. A device according to claim 6, wherein said induction welding is carried out at a frequency in the range of 1 to 5 megahertz.

10. A device according to claim 7, wherein said induction welding is carried out at a frequency in the range of 1 to 5 megahertz.

* * * * *